US006347297B1

(12) United States Patent
Asghar et al.

(10) Patent No.: US 6,347,297 B1
(45) Date of Patent: *Feb. 12, 2002

(54) MATRIX QUANTIZATION WITH VECTOR QUANTIZATION ERROR COMPENSATION AND NEURAL NETWORK POSTPROCESSING FOR ROBUST SPEECH RECOGNITION

(75) Inventors: Safdar M. Asghar, Austin, TX (US); Lin Cong, Orangevale, CA (US)

(73) Assignee: Legerity, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/166,640

(22) Filed: Oct. 5, 1998

(51) Int. Cl.$^7$ .......................... G10L 15/08; G10L 15/16
(52) U.S. Cl. ....................................... 704/243; 704/232
(58) Field of Search ................................ 704/222, 230, 704/231, 232, 256, 243

(56) References Cited

U.S. PATENT DOCUMENTS

| | | | |
|---|---|---|---|
| 4,383,135 A | 5/1983 | Scott et al. ................ | 179/1 SD |
| 4,519,094 A | 5/1985 | Brown et al. .................. | 381/43 |
| 4,933,973 A | 6/1990 | Porter ........................... | 381/43 |
| 4,975,955 A | 12/1990 | Taguchi ........................ | 381/36 |
| 5,031,217 A | * 7/1991 | Nishimura .................... | 381/43 |

(List continued on next page.)

OTHER PUBLICATIONS

Furui, S. (1988), A VQ–Based Preprocessor Using Cepstral Dynamic Features for Speaker–Ind. Large Vocabulary Word Recognition, IEEE Trans on Acoustic, Speech and Signal Proc, v.36, n.7, p.980–987.*

Xydeas, C.S. and Cong, L. (1995) "Robust Speech Recognition in a Car Environment"; Presented at DSP95 International Conference on DSP, Jun. 26–28, 1995, Limassol, Cyprus, vol. 1, pp. 84–89.*

Xydeas, C.S. and Cong, L., (1996) "Robust Speech Recognition using Fuzzy Mtrix Quantization, Neural Networks, and Hidden Markov Models,"Proc. of EUSIPCO–96, vol.3, pp.1587–1590.*

(List continued on next page.)

Primary Examiner—Tālivaldis Ivars Šmits
Assistant Examiner—Angela Armstrong
(74) Attorney, Agent, or Firm—Skjerven Morrill MacPherson LLP; Stephen A. Terrile (57) ABSTRACT

A speech recognition system utilizes both matrix and vector quantizers as front ends to a second stage speech classifier such as hidden Markov models (HMMs) and utilizes neural network postprocessing to, for example, improve speech recognition performance. Matrix quantization exploits the "evolution" of the speech short-term spectral envelopes as well as frequency domain information, and vector quantization (VQ) primarily operates on frequency domain information. Time domain information may be substantially limited which may introduce error into the matrix quantization, and the VQ may provide error compensation. The matrix and vector quantizers may split spectral subbands to target selected frequencies for enhanced processing and may use fuzzy associations to develop fuzzy observation sequence data. A mixer provides a variety of input data to the neural network for classification determination. The neural network's ability to analyze the input data generally enhances recognition accuracy. Fuzzy operators may be utilized to reduce quantization error. Multiple codebooks may also be combined to form single respective codebooks for split matrix and split vector quantization to reduce processing resources demand.

44 Claims, 2 Drawing Sheets

U.S. PATENT DOCUMENTS

| | | | |
|---|---|---|---|
| 5,046,099 A | | 9/1991 | Nishimura .................... 381/43 |
| 5,185,848 A | | 2/1993 | Aritsuka et al. ............... 395/2 |
| 5,228,087 A | | 7/1993 | Bickerton .................... 381/43 |
| 5,255,339 A | | 10/1993 | Fette et al. .................... 395/2 |
| 5,285,522 A | | 2/1994 | Mueller ..................... 395/2.41 |
| 5,313,555 A | | 5/1994 | Kamiya ..................... 395/2.42 |
| 5,414,796 A | * | 5/1995 | Jacobs et al. ............... 395/2.3 |
| 5,583,888 A | * | 12/1996 | Ono .......................... 375/240 |
| 5,596,679 A | | 1/1997 | Wang ....................... 395/2.45 |
| 5,598,505 A | * | 1/1997 | Austin et al. ............... 704/226 |
| 5,625,747 A | | 4/1997 | Goldberg et al. .......... 395/2.52 |
| 5,649,056 A | * | 7/1997 | Nitta .......................... 704/256 |
| 5,664,053 A | * | 9/1997 | Laflamme et al. .......... 704/219 |
| 5,696,878 A | | 12/1997 | Ono et al. ................. 395/2.59 |
| 5,734,793 A | | 3/1998 | Wang ....................... 395/2.41 |
| 5,819,224 A | * | 10/1998 | Xydeas ....................... 704/266 |
| 5,970,445 A | * | 10/1999 | Yamamoto et al. ......... 704/230 |
| 6,058,205 A | * | 5/2000 | Bahl et al. .................. 382/159 |
| 6,061,652 A | * | 5/2000 | Tsuboka et al. ............ 704/245 |
| 6,067,515 A | * | 5/2000 | Cong et al. ................. 704/243 |
| 6,070,136 A | * | 5/2000 | Cong et al. ................. 704/222 |

OTHER PUBLICATIONS

Xydeas, C.S., Cong, L. (1995), Combining Neural Network Classification with Fuzzy Vector Quantization and Hidden Markov Models for Robust Isolated Word Speech Recognition, Proc. 1995.*

IEEE International Symposium on Information Theory, p. 174.*

Cong, Ling, Xydeas, Costas S. Prof. and Ferwood, Anthony F. Combining Fuzzy Vector Quantization and Neural Network Classification for Robust Isolated Word Speech Recognition: Singapore ICCS 1994, pp. 884–887.

Rabiner, Lawrence and Juang, Biing–Hwang: "Fundamentals of Speech Recognition" 1993; pp. 190–195.

Xydeas, C.S. Prof. and Cong, Lin "Robust Speech Recognition Using Fuzzy Matrix Quantisation, Neural Networks and Hidden Markov Models" Sep. 1996, pp. 1587–1590.

Parsons, Thomas W.; "Voice and Speech Processing"; McGraw–Hill, Inc., New York, 1987; pp. 170–171.

Xydeas, C.S. and Lin Cong; "Robust Speech Recognition Using Fuzzy Matrix Quantization and Neural Networks"; Proceedings of International Conference on Communication Technology; Beijing, China—ICCT '96; pp. 432–435; IEEE; New York (May 5–7, 1996).

Cong, Lin; "A Study of Robust IWSR Systems"; PhD Thesis submitted to The University of Manchester School of Engineering, Division of Electrical Engineering; Manchester, United Kingdom; pp. 1–209. May 1996.*

Waibel, Alexander; "Neural Network Approaches for Speech Recognition"; Chapter 18 of *Advances in Speech Signal Processing*; edited by Sadaoki Furui and M. Mohan Sondhi; Marcel Dekker, Inc.; New York, New York; 1992; pp. 555–595.*

Xydeas, C. S. and Cong, L.; "Combining Neural Network Classification with Fuzzy Vector Quantization and Hidden Markov Models for Robust Isolated Word Speech Recognition"; *Signal Processing VIII Theories and Applications*, vol. III; Proceedings of the IEEE International Symposium on Information Theory, IEEE Press, 1995, p. 174.*

Xydeas, C. S. and Cong, L.; "Robust Speech Recognition in A Car Environment"; Presented at DSP95 International Conference on Digital Signal Processing, Jun. 26–28, 1995, Limassol, Cyprus; vol. 1, pp. 84–89.

Cong, Lin, Prof. C.S. Xydeas, and Anthony Ferwood; "A Study of Robust Isolated Word Speech Recognition Based on Fuzzy Methods"; Presented at EUSIPCO–94, VII European Signal Processing Conference, Sep. 13–16, 1994; Scotland, UK.; 4 pages.

Gibson, Jerry D.; "Coding, Transmission, and Storage"; Chapter 14, Speech Signal Processing, of *The Electrical Engineering Handbook*; Edition–in–Chief Richard C. Dorf; ©1993 by CRC Press, Inc.; pp. 279–314.

Gersho, Allen and Shihua Wang; "Vector Quantization Techniques in Speech Coding"; Chapter 2 of *Advances in Speech Signal Processing*; edited by Sadaoki Furui and M.Mohan Sondhi; Marcel Dekker, Inc.; New York, New York; 1992; pp. 49–84.

Kroon, Peter and Bishnu S. Atal; "Predictive Coding of Speech Using Analysis–by–Synthesis Techniques"; Chapter 5 of *Advances in Speech Signal Processing*; edited by Sadaoki Furui and M. Mohan Sondhi; Marcel Dekker, Inc.; New York, New York; 1992; pp. 141–164.

Honda, Masaaki and Yoshinao Shiraki; "Very Low–Bit–Rate Speech Coding"; Chapter 7 of *Advances in Speech Signal Processing*; edited by Sadaoki Furui and M. Mohan Sondhi; Marcel Dekker, Inc.; New York, New York; 1992; pp. 209–230.

Schroeter, Juergen and M. Mohan Sondhi; "Speech Coding Based on Physiological Models of Speech Production"; Chapter 8 of *Advances in Speech Signal Processing*; edited by Sadaoki Furui and M. Mohan Sondhi; Marcel Dekker, Inc.; New York, New York; 1992; pp 231–268.

* cited by examiner

MATRIX QUANTIZATION WITH VECTOR QUANTIZATION ERROR COMPENSATION AND NEURAL NETWORK POSTPROCESSING FOR ROBUST SPEECH RECOGNITION

BACKGROUND OF THE INVENTION

1. Field of the Invention

This invention relates to speech recognition and more particularly relates to combining matrix and vector quantization with selective enhanced processing and neural network postprocessing to provide efficient and robust speech recognition.

2. Description of the Related Art

Speech is perhaps the most important communication method available to mankind. It is also a natural method for man-machine communication. Man-machine communication by voice offers a whole new range of information/communication services which can extend man's capabilities, serve his social needs, and increase his productivity. Speech recognition is a key element in establishing man-machine communication by voice, and, as such, speech recognition is an important technology with tremendous potential for widespread use in the future.

Voice communication between man and machine benefits from an efficient speech recognition interface. Speech recognition interfaces are commonly implemented as Speaker-Dependent (SD)/Speaker-Independent (SI) Isolated Word Speech Recognition (IWSR)/continuous speech recognition (CSR) systems. The SD/SI IWSR/CSR system provides, for example, a beneficial voice command interface for hands free telephone dialing and interaction with voice store and forwarding systems. Such technology is particularly useful in an automotive environment for safety purposes.

However, to be useful, speech recognition must generally be very accurate in correctly recognizing (classifying) an input signal with a satisfactory probability of accuracy. Difficulty in correct recognition arises particularly when operating in an acoustically noisy environment Recognition accuracy may be severely, unfavorably impacted under realistic environmental conditions where speech is corrupted by various levels of acoustic noise.

Figure 1:
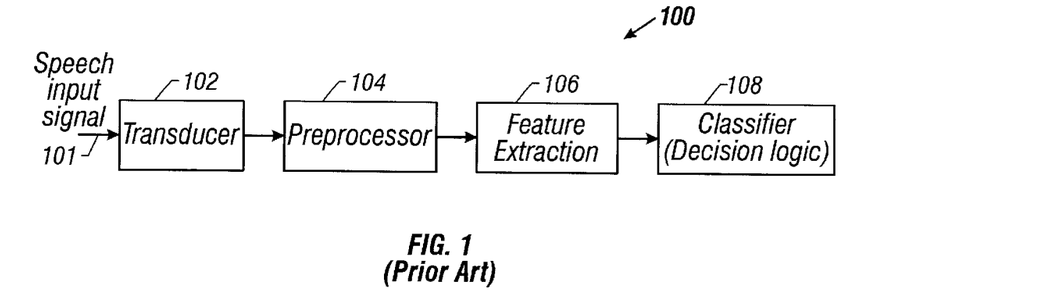
FIG. 1, labeled prior art, illustrates a general speech recognition system.

FIG. 1 generally characterizes a speech recognition process by the speech recognition system 100. A microphone transducer 102 picks up an input signal 101 and provides to signal preprocessor 104 an electronic signal representation of input signal 101. The input signal 101 is an acoustic waveform of a spoken input, typically a word, or a connecting string of words. The signal preprocessor 104 may, for example, filter the input signal 101, and a feature extractor 106 extracts selected information from the input signal 101 to characterize the signal using, for example, cepstral frequencies or line spectral pair frequencies (LSPs).

Figure 2:
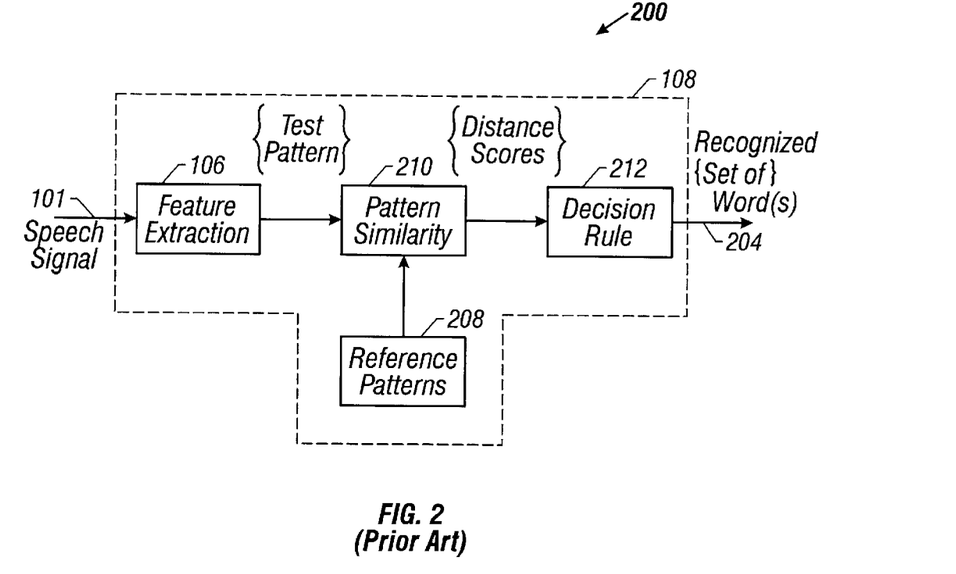
FIG. 2 illustrates a pattern-recognition based speech recognition system.

Referring to FIG. 2, feature extraction in operation 106 is basically a data-reduction technique whereby a large number of data points (in this case samples of the input signal 101 recorded at an appropriate sampling rate) are transformed into a smaller set of features which are "equivalent", in the sense that they faithfully describe the salient properties of the input signal 101. Feature extraction is generally based on a speech production model which typically assumes that the vocal tract of a speaker can be represented as the concatenation of lossless acoustic tubes (not shown) which, when excited by excitation signals, produce a speech signal. Samples of the speech waveform are assumed to be the output of a time-varying filter that approximates the transmission properties of the vocal tract. It is reasonable to assume that the filter has fixed characteristics over a time interval on the order of 10 to 30 milliseconds. The, short-time samples of input signal 101 may be represented by a linear, time-invariant all pole filter designed to model the spectral envelope of the input signal 101 in each time flame. The filter may be characterized within a given interval by an impulse response and a set of coefficients.

Feature extraction in operation 106 using linear predictive (LP) speech production models has become the predominant technique for estimating basic speech parameters such as pitch, formants, spectra, and vocal tract area functions. The LP model allows for linear predictive analysis which basically approximates input signal 101 as a linear combination of past speech samples. By minimizing the sum of the squared differences (over a finite interval) between actual speech samples and the linearly predicted ones, a unique set of prediction filter coefficients can be determined. The predictor coefficients are weighting coefficients used in the linear combination of past speech samples. The LP coefficients are generally updated very slowly with time, for example, every 10–30 milliseconds, to represent the changing states of the vocal tract. LP prediction coefficients are calculated using a variety of well-known procedures, such as autocorrelation and covariance procedures, to minimize the difference between the actual input signal 101 and a predicted input signal 101. The LP prediction coefficients are often stored as a spectral envelope reference pattern and can be easily transformed into several different representations including cepstral coefficients and line spectrum pair (LSP) frequencies. Details of LSP theory can be found in N. Sugamura, "Speech Analysis and Synthesis Methods Developed at ECL in NTT-from LPC to LSP", Speech Communication 5, Elsevier Science Publishers, B. V., pp. 199–215 (1986).

Final decision-logic classifier 108 utilizes the extracted feature information to classify the represented input signal 101 to a database of representative input signal 101. Speech recognition classifying problems can be treated as a classical pattern recognition problem. Fundamental ideas from signal processing, information theory, and computer science can be utilized to facilitate isolated word recognition and simple connected-word sequences recognition.

FIG. 2 illustrates a more specific speech recognition system 200 based on pattern recognition as used in many IWSR type systems. The extracted features representing input signal 101 are segmented into short-term input signal 101 frames and considered to be stationary within each frame for 10 to 30 msec duration. The extracted features may be represented by a D-dimensional vector and compared with predetermined, stored reference patterns 208 by the pattern similarity operation 210. Similarity between the input signal 101 pattern and the stored reference patterns 208 is determined in pattern similarity operation 210 using well-known vector quantization processes. The vector quantization process yields spectral distortion or distance measures to quantify the score of fitness or closeness between the representation of input signal 101 and each of the stored reference patterns 208.

The decision rule operation 212 receives the distance measures and determines which of the reference patterns 208 the input signal 101 most closely represents. In a "hard" decision making process, input signal 101 is matched to one of the reference patterns 208. This one-to-one "hard decision" ignores the relationship of the input signal 101 to all the other reference patterns 208. Fuzzy methods have been introduced to provide a better match between vector quantized frames of input signal 101 and reference patterns 208. In a "soft" or "fuzzy" decision making process, input signal 101 is related to one or more reference patterns 208 by weighting coefficients.

Matrix quantization has also been used to introduce temporal information about input signal 101 into decision rule operation 212. Fuzzy analysis methods have also been incorporated into matrix quantization processes, as described in Xydeas and Cong, "Robust Speech Recognition In a Car Environment", Proceeding of the DSP95 International Conference on Digital Signal Processing, Jun. 26–28, 1995, Limassol, Cyprus. Fuzzy matrix quantization allows for "soft" decisions using interframe information related to the "evolution" of the short-term spectral envelopes of input signal 101.

Despite conventional speech recognition achievements, research and development continues to focus on more efficient speech recognition systems with higher speech recognition accuracy.

SUMMARY OF THE INVENTION

In one embodiment, vector quantization operates on a single frame of input signal frequency parameters and, at least generally, does not incorporate temporal signal information into the vector quantization operation. However, vector quantization performs particularly well when temporal information is scarce or non-existent, such as with short input signal duration. Matrix quantization operates on multiple input signal frames and, thus, utilizes both temporal and frequency information about the input signal. However, errors may be introduced into matrix quantization operations when operating on a short duration input signal. Thus, although matrix quantization generally leads to a higher recognition accuracy than vector quantization, vector quantization can compensate for matrix quantization errors that may occur when operating on brief duration input signals. Additionally, signal features may be divided or split by, for example, frequency subbands to allow for differential processing to, for example, target enhanced processing on greater more affected subbands. Split matrix and split vector quantization techniques may be used to more efficiently and more accurately classify the input signal. Furthermore, additional speech classifiers such as hidden Markov models may be trained and their stochastic output data may serve as input data to a further speech classifier such as a neural network. Respective hidden Markov models may be designed using quantization data as the observation sequences and a probability algorithm such as the Viterbi algorithm to determine likelihood probabilities.

In one embodiment, a new hybrid speech recognition system combines Matrix Quantization (MQ) and Vector Quantization (VQ) with Hidden Markov Models (HMMs) and neural network postprocessing to efficiently utilize processing resources and improve speech recognition performance. This MQ/HMM/NN_VQ/HMM/NN system exploits the "evolution" of speech short-term spectral envelopes with error compensation from VQ/HMM processes. Additionally, the neural network, which in one embodiment is a multi-layer perception type neural network, further enhances recognition accuracy. Acoustic noise may affect particular frequency domain subbands. In one embodiment, split matrix and split vector quantizers exploit localized noise by efficiently allocating enhanced processing technology to target noise-affected input signal parameters and minimize noise influence. The enhanced processing technology employs, for example, a weighted LSP and signal energy related distance measure in a LBG algorithm. In another embodiment, matrix and vector quantizers are utilized to process incoming speech data without splitting frequency subbands. In another embodiment, a variety of input data may be provided to the neural network to efficiently maximize recognition accuracy. In a further embodiment, 'hard' decisions, i.e., non-fuzzy decisions, are utilized by the respective quantizers to reduce processing resource demand while continuing to use other enhanced recognition resources to achieve high percentage speech recognition accuracy.

In one embodiment, multiple speech processing subsystems are employed to provide initial quantization data to respective speech classifiers. Output data from the speech classifiers may be combined in such a way to compensate for quantization errors introduced by the speech processing subsystems. In another embodiment, one of the speech processing subsystems includes a vector quantizer which provides quantization information to a speech classifier having hidden Markov models. Another speech processing subsystem includes a matrix quantizer which provides quantization information to another speech classifier having hidden Markov models. Output data from the respective hidden Markov models respectively associated with the vector and matrix quantizers may be mixed using any of a variety of criteria and provided to a neural network for enhanced recognition accuracy speech classifiers.

In another embodiment of the present invention, a speech recognition system includes a vector quantizer to receive first parameters of an input signal and to generate a first quantization observation sequence and a first speech classifier to receive the first quantization observation sequence from the vector quantizer and to generate first respective speech classification output data. The speech recognition system further includes a matrix quantizer to receive second parameters of the input signal and to generate a second quantization observation sequence, a second speech classifier to receive the second quantization observation sequence from the matrix quantizer and to generate second respective speech classification output data; and a mixer to combine corresponding first and second respective speech classification data to generate third respective speech classification data and to generate output data from the first, second, and third speech classification data. The speech recognition system also includes a neural network to receive output data from the mixer and to determine fourth respective speech classification output data.

In another embodiment of the present invention, a method includes the steps of processing first parameters of the input signal to relate the first parameters to first reference data wherein the first parameters include frequency and time domain information, generating first output data relating the first parameters to reference data, and processing second parameters of the input signal to relate the second parameters to second reference data wherein the second parameters include frequency domain information. The method further includes the steps of generating second output data relating the second parameters to the second reference data, combining the first output data and second output data into third output data to compensate for errors in the first output data, and providing the first, second, and third output data to a neural network to classify the input signal.

BRIEF DESCRIPTION OF THE DRAWINGS

Features appearing in multiple figures with the same reference numeral are the same unless otherwise indicated.

DETAILED DESCRIPTION OF THE PREFERRED EMBODIMENTS

The following description of the invention is intended to be illustrative only and not limiting.

Figure 3:
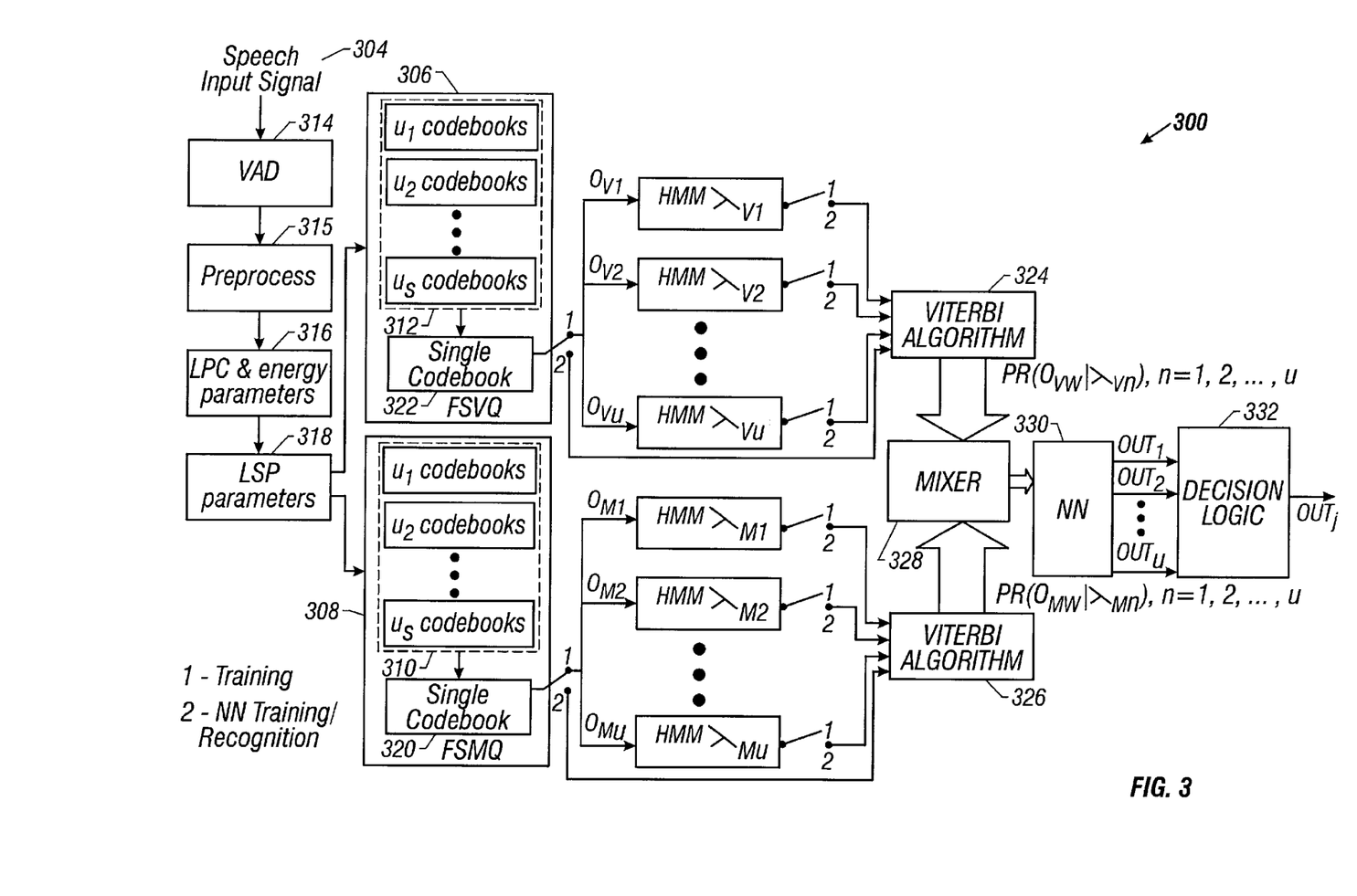
FIG. 3 illustrates a speech recognition system utilizing split vector and split matrix quantizers as a front end to respective hidden Markov model speech classifiers and a neural network postprocessor.

The following definitions are used herein unless otherwise indicated:

Word—any spoken utterance including words and numbers;

Speech—any word and background acoustic noise;

The following abbreviations are used herein unless otherwise indicated:

FMQ—fuzzy matrix quantization
FVQ—fuzzy vector quantization
FSMQ—fuzzy split matrix quantizer;
FSVQ—fuzzy split vector quantizer;
SMQ—split matrix quantization;
SVQ—split vector quantization;
MQ—matrix quantization;
VQ—vector quantization;
HMM—hidden Markov model;
λ—a HMM process;
Pr(O|λ)—probability of λ producing observation sequence O;
MLP NN—multilevel perception neural network;
NN—neural network;
LSP—line spectral pair,
dB—decibel;
SD/SI—speaker dependent/speaker independent;
SNR—signal to noise ratio;

Referring to an embodiment of a speech recognition system in FIG. 3, speech recognition system 300 recognizes a speech input signal 304 using the combined classification power of both time and frequency domain information derived from matrix quantization with error compensation from frequency domain information derived from vector quantization. Fuzzy processes may be implemented to further enhance recognition accuracy as illustratively discussed in chapter 3 of the Doctor of Philosophy thesis of Lin Cong entitled "A Study of Robust IWSR Systems" (L. Cong thesis) and located in the John Rylands University Library of Manchester in Manchester, England, which thesis is hereby incorporated by reference in its entirety. Vector quantization operates on a single frame of input signal frequency parameters and, at least generally, does not incorporate temporal signal information into the vector quantization processing operation. However, vector quantization performs particularly well when temporal information is scarce or nonexistent, such as with short input signal duration. Matrix quantization operates on multiple input signal flames representing the time "evolution" of an input signal and, thus, utilizes both time domain and frequency domain information about the input signal. However, errors may be introduced into matrix quantization processing operations when operating on a short duration input signal. Thus, although matrix quantization generally leads to a higher recognition accuracy than vector quantization, vector quantization information may be utilized to compensate for matrix quantization errors that may occur when operating on input signals having limited useful temporal information.

"Matrix quantization" and "vector quantization" nomenclature herein represent the general quantization processes which include fuzzy and hard decision vector quantization and matrix quantization and split vector and split matrix quantization. Splitting matrix and vector quantization processes into a respective number of S groups where $S_M$ and $S_v$ are greater than or equal to one allows targeting of specific spectral frequency region(s) for enhanced processing while more general processing may be applied to other spectral frequency region(s) where the cost of enhanced processing outweighs the benefits. Generally, for S>1, S groups of parameters may be separated for fuzzy or hard split vector quantization, and for S>1, S groups of parameters may be separated for fuzzy or hard split matrix quantization. Note that S may vary and may be different for vector and matrix quantization and the number of parameters in each group may vary from group to group. The groups may be separated on the basis of, for example, isolating groups primarily affected by localized noise. For example, we have observed that in some acoustic environments, noise frequencies are primarily located in lower frequency spectral regions. Thus, speech input signal 304 spectral parameters may be split, for example, into a first group which is primarily affected by the acoustic noise and into a second group that is primarily unaffected by the acoustic noise. An enhanced distance measure may be employed in the quantization of the first group to counteract the acoustic noise corruption of the input signal 304 parameters, and a simpler distance measure may be employed in conjunction with quantization of the second group. Thus, processing resources may be efficiently allocated more heavily to processing the first group of parameters while using less but sufficient processing resources to process the second group of parameters.

In addition to matrix and vector quantization, the speech recognition system 300 may further utilize probabilistic classification processes to further enhance speech recognition accuracy. Matrix and vector quantizers serve as front end speech classifiers to provide observation sequences, in the forms of respective classification vectors, to respective HMMs in order to characterize the HMMs during training. Each of the HMMs are preferably trained for a single word and may be gender specific. During speech recognition processes, the respective HMMs and a Viterbi algorithm provide maximum likelihood probabilistic output data which relate the speech input signal 304 to a specific HMM which is most likely to have generated the observation sequence. A mixer 328 combines the Viterbi algorithm processed HMM output data corresponding to vector quantization and Viterbi algorithm processed HMM output data corresponding to matrix quantization. The mixer 328 may, for example, weight the vector and/or matrix related HMM output data to, for example, compensate for any matrix quantization error and, thus, enhance recognition accuracy. Additionally, a neural network 330, such as an MLP neural network, enhances recognition accuracy by processing input data generated by the mixer 328 by determining the probabilities of each vocabulary word matching input signal 304. Decision logic 332 then determines the vocabulary word that is most likely to match the input signal 304. The speech recognition system 300 may be utilized in conjunction with SD/SI speech recognition.

Additionally, single or multiple codebooks may be employed by matrix and vector quantizers 306 and 308 to efficiently process speech input signal 304 parameters for speech recognition. Quantization with a single codebook is illustratively described in U.S. patent application Ser. No. 08/883,979 by Safdar M. Asghar and Lin Cong and entitled "Speech Recognition System Using A Single Robust Codebook", which is hereby incorporated by reference in its entirety. Quantization with multiple codebooks is illustratively described in U.S. patent application Ser. No. 08/883,978 by Lin Cong and Safdar M. Asghar and entitled "Adaptive Speech Recognition With Selective Input Data To A Speech Classifier," which is hereby incorporated by reference in its entirety.

The speech recognition system 300 may be implemented in an electronic system as instructions and data stored in a memory and utilized by a processor or processors coupled to the memory.

Referring to FIG. 3, in preparation for speech recognition with the flow path set to position 1, training, speech recognition system 300 undergoes a training process to design respective codebooks for the VQ 306 and MQ 308. A data base of u words repeated r times and corrupted by q different levels of acoustic noise is used during the training process, where u corresponds to the vocabulary size of speech recognition system 300, and q and r are positive integers, for example, seven and two, respectively.

Initially during training of VQ 306 and MQ 308, a single codebook is designed for each of the u words in each of the S matrices for each of VQ 306 and MQ 308. Thus, uS matrix codebooks 310 and uS vector codebooks 312 are respectively designed with the $n^{th}$ word, n=1, 2, . . . u, being repeated r times at q SNR levels. Speech recognition system 300 is designed for robustness by training with multiple acoustic noise SNR corruption levels to better model realistic speech input signal 304 input conditions where speech is corrupted by acoustic noise. In the embodiment of FIG. 3, the respective SNR levels used to train speech recognition system 300 are, for example, clean speech (∞), 35 dB, 25 dB, 20 dB, 15 dB, 10 dB, and 5 dB to model various noises in an automotive environment. Other SNR values may be chosen to model other acoustic environments or more extensively model the automotive environment. Thus, a total training database of r times q (rq) entries is used to design each of the uS matrix codebooks 310 and uS vector codebooks 312. Each of the uqr entries in the total training database is respectively provided as speech input signal 304 to speech recognition system 300 and preprocessed by preprocess operation 315 which, for example, band limits speech input signal 304 to 3.6 kHz and samples speech input signal 304 at 8 ksamples/sec with a resolution of 16 bits per sample. During speech recognition, when continuous speech is produced, voice activity detector (VAD) 314 effectively defines end points of speech input signal 304 words for SD/SI independent word speech recognition.

Figure 4:
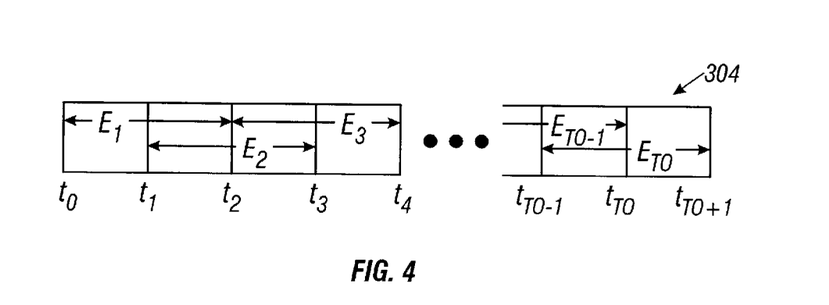
FIG. 4 illustrates a sequence of frames defining a speech input signal.

Referring to FIGS. 3 and 4, a D order linear predictive code (LPC) analysis is performed in LPC and energy parameters operation 316 on each of the TO frames of speech input signal 304 to compute the LPC coefficients for the acoustic signal 304 frame using, for example, the Burg algorithm. A 10 msec overlap is provided between frames, and each of the TO frames is defined by a time window of $t_a$ to $t_{a+2}$, a=0 through TO−1, with an overlap by an adjacent frame of $t_{a+1}$ to $t_{a+2}$. D may vary depending on tradeoffs between desired resolution and processing speed and in this embodiment, D is generally in the range of ten to sixteen, and is, for example, twelve. Frame times for each of the TO frames may vary and are, in general, chosen to represent an approximately static vocal tract period in a range of, for example, 10–30 msec, and are, for example, 20 msec.

Energy parameters $E_y$, y=TO, may be generated in LPC and energy parameters operation 316 for each frame of each speech input signal 304. Spectral frequency parameters alone may be used to characterize a speech input signal 304 and codewords in respective codebooks. Additionally, both energy and spectral frequency parameters may be used to characterize speech input signal 304 and the codewords and to generate a quantization distance measure. During predetermined time intervals, words typically have unique energy "signatures", and, thus, utilizing input signal energy parameters can be used to increase classification accuracy. The energy, $E_y$, in each frame of the speech input signal 304 may be used during training to develop codeword parameters in VQ 306 and MQ 308, and be used during recognition to compare speech input signal 304 energy parameters to corresponding codeword parameters derived from energy parameters of training database entries. The utilization of input signal energies for classification purposes is further illustratively described in the U.S. patent application Ser. No. 08/907,145 by Safdar M. Asghar and Lin Cong entitled "Robust Speech Parameters In A Robust Speech Recognition System", which is hereby incorporated by reference in its entirety.

When the speech input signal 304 is corrupted by an acoustic noise signal, a distance measure using determined energy and frequency parameters enhances the distinction between respective input signals by at least partially suppressing the noise signal component of the speech input signal 304. For example, during an interval of time, acoustic noise signal energy is relatively constant in the time domain while the speech word signal energy typically varies more substantially during the same interval of time. By determining the first derivative or change of the input signal energy over different intervals of time, corruption by a noise signal with relatively constant energy may be significantly eliminated to enhance the distinction between respective input signal words. Furthermore, the energy of the second derivative or change of the input signal first energy derivative during the same intervals of time may be used to further enhance the distinction between respective input signal words. Furthermore, as described in more detail below, error factors may be derived and employed in the distance measure to further address acoustic noise corruption of the speech input signal 304 parameters.

To utilize speech input signal 304 energy distinctions and typical noise energy characteristics, each frame of speech input signal 304 is processed in LPC and energy parameters operation 316 to also determine the respective energy, $E_y$, in the $y^{th}$ frame, y=1, 2, . . . , TO, during the 20 msec time interval of $t_a$ to $t_{a+2}$, where $E_y$ is defined as:

$$E_y = \sum_{n=0}^{N} |(s(n)_y)|^2,$$

where $s(n)_y$ is the sampled input signal of the $y^{th}$ frame, and N equals the number of samples in the $y^{th}$ frame defined by the time interval $t_a$ to $t_{a+2}$, which equals 160 when speech input signal 304 is sampled at 8 ksamples/sec.

Speech input signal 304 generally represents a speech signal word which may be corrupted by an acoustic noise signal. To decrease the amount of data used to represent the energy signature of each speech input signal 304, $E_y$ for each frame is normalized using the frame of speech input signal 304 having the maximum energy, $E_{max}$, i.e.

$$E_{y,norm} = \frac{E_y}{E_{max}}, \quad y = 1, 2, \ldots, TO.$$

To further reduce the amount of data used to represent each speech input signal 304 energy signature while maintaining sufficient resolution to distinguish between different input signals, the logarithm of $E_{y,norm}$, is determined in LPC and energy parameters operation 316. Log $E_{y,norm}$ for each frame may be used during training and during recognition as a parameter in the quantization process.

In some environments, such as an automobile environment, noise signals are generally predictable or may be dynamically determined and occupy a low frequency spectral region. In the sampling window defined by the time interval $t_a$ to $t_{a+2}$, the rate of change of the noise signal from frame to frame is small when $t_{a+1}$ minus $t_a$ is relatively small. Additionally, overlapping of successive frames effectively decreases the frame time interval from $t_{a+2}-t_a$ to $t_{a+1}-t_a$ for purposes of determining flame-to-frame energy changes. Frame times may vary inversely to the noise signal frequency and processing performance. Thus, when speech input signal 304 is corrupted by a noise signal, taking the first derivative of each frame of speech input signal 304 in LPC and energy parameters operation 316 aids in suppressing the impact of any noise signal. The energy of the first derivative, $E'_y$, of each frame of the input signal is defined as, $$E'_y = (E_y)' = E_y - E_{y-1},$$

where $E_y$ is the original energy of they frame, $y=1, 2, \ldots, TO$, and $E_{y-1}$ is the original energy of the preceding $(y-1)^{th}$ frame. For $y=1$, $E_{y-1}$ is zero. As with the original speech input signal 304, the first derivative energy data, $E'_y$, may be reduced for speech input signal 304 while maintaining sufficient resolution by utilizing the first derivative of $E_{y,norm}$ to generate normalized first derivative energy parameters, $E'_{y,norm}$. Furthermore, the data may be reduced in LPC and energy parameters operation 316 further for efficient processing by determining the logarithm of $E'_{y,norm}$, and also using log $E'_{y,norm}$ as a parameter in the quantization process to suppress the impact of low frequency noise, so that $E'_{y,(\log,\ norm)} = \log E_y$, norm$-\log E_{y-1}$, norm.

Additionally, in LPC and energy parameters operation 316, the second derivative of the energy, $E''_y$, in each frame of speech input signal 304 is also determined and defined as, $$E''_y = (E'_y)' = E'_y - E'_{y-1},$$

where $E'_y$ is the first derivative of the original energy $E_y$ of the $y^{th}$ frame, $y=1,2,\ldots, TO$, and $E_{y-1}$ is the first derivative of energy of the preceding $(y-1)^{th}$ frame. For $y=1$, $E'_y$ is zero. As with the original speech input signal 304 and the first derivative energy data, the second derivative energy data, $E''_y$, $y=1,2,\ldots, TO$, may be reduced for speech input signal 304 while maintaining sufficient resolution by utilizing the first derivative of the normalized first derivative energy parameter, $E'_{y,norm}$ to generate normalized second derivative energy parameters, $E''_{y,norm}$. Furthermore, the data may again be reduced further by utilizing $E'_y$ that is determined using log and/or normalized $E_y$ parameters.

The training process continues with LSP operation 318 generating, in a well-known manner, LSP frequencies (coefficients) from the respective LPC coefficients. LSP coefficients are, thus, generated for each speech input signal 304 frame for all q SNR levels from the LPC coefficients. The LSP representations of speech input signal 304 are used to define a spectral envelope, and they provide a robust representation of the speech short-term magnitude spectral envelope of speech input signal 304. Band limited input distortion affects only a subset of LSP coefficients, as compared to the case of a cepstral representation where input noise corrupts all the coefficients. Additionally, LSP parameters have both well-behaved dynamic range and filter stability preservation properties and can be coded more efficiently than other parameters. As a result, the LSP representation can lead to a 25–30% bit-rate reduction in coding the filter (vocal tract) information, as compared to the cepstral coefficient representation. Furthermore, spectral LSP sensitivities are localized, i.e., a change in a given LSP produces a change in the LP power spectrum only in its neighborhood frequencies. For example, a change in an LSP from 1285 Hz to 1310 Hz affects the LP power spectrum near 1300 Hz. This is particularly useful when speech is corrupted by narrow band noise in which case only a subset of LSP parameters are affected by the input noise.

In general given a short segment of speech input signal 304 and the corresponding all-pole filter $H(z)=G/A(z)$, where $A(z)$ is the inverse filter given by $$A(z)=1+a_1z^{-1}+a_2z^{-2}+\ldots +a_pz^{-D}$$

where D is the order of the predictor and $\{a_i\}$ are the prediction coefficients, the LSPs are defined by decomposing the inverse filter polynomial into two polynomials, $$P(z)=A(z)+z^{-(D+1)}A(z-1),$$

and $$Q(z)=A(z)-z^{-(D+1)}A(z-1),$$

where $P(z)$ is a symmetric polynomial, $Q(z)$ is an anti-symmetric polynomial and $$A(z)=\tfrac{1}{2}[P(z)+Q(z)].$$

The roots of the polynomials $P(z)$ and $Q(z)$ define the LSP coefficients.

Continuing the training process, each of the uS matrix codebooks 310 contains a subset s, $s=1, 2, \ldots, S$, of the parameters used to characterize speech input signal 304. In one embodiment of speech recognition system 300, S equals two and each of the $u_1$ matrix codebooks 310 contain the first through sixth order LSP parameters of each speech input signal 304 frame which are the primary LSP parameters affected by acoustic noise. The remaining $u_2$ matrix codebooks 310 contain the remaining orders of LSP parameters, for example, the seventh through twelfth order LSP parameters of each speech input signal 304 frame. In one embodiment, the matrices of uS matrix codebooks 310 are constructed such that each of the S submatrices contains consecutive rows of speech input signal 304 parametric data Likewise, each of the uS vector codebooks 312 contains a subset s, $s=1, 2, \ldots, S$, of the parameters used to characterize a particular vocabulary word represented by speech input signal 304. In one embodiment of speech recognition system 300, S equals two and each of the $u_1$ vector codebooks 312 contains the first through sixth order LSP parameters of each speech input signal 304 frame which are the primary LSP parameters affected by acoustic noise. The remaining $u_2$ vector codebooks 312 contain the remaining orders of LSP parameters, for example, the seventh through twelfth order LSP parameters of each speech input signal 304 frame. In one embodiment, the vectors of uS vector codebooks 312 are constructed such that each of the S subvectors contains consecutive speech input signal 304 parametric data.

Each of the uS matrix codebooks 310 for a given vocabulary word is designed by developing a matrix entry from each of the qr input entries for a corresponding speech input signal 304 vocabulary word $W_{nhm}$, n=1, 2, ... u, h=1, 2, ..., q, m=1, 2, ..., r, from the database of uqr words. The qr matrix entries for each of the u vocabulary words at each of the q SNR levels are processed to optimally cluster each of the qr entries for each of the uS matrix codebooks 310 into $C_s$ cells. Each of the uS vector codebooks 312 for a given vocabulary word is designed by developing a vector entry from each of the qr entries for a corresponding speech input signal 304 word $W_{nhm}$, n=1, 2, ..., u, h=1, 2, ..., q, m=1, 2, ..., r, from the database of uqr words. The qr vector entries for each of the u words at each of the q SNR levels are processed to optimally cluster each of the qr entries for each of the uS vector codebooks 312 into $C_s$ cells. Note that, $C_s$ for MQ 308 may be different or identical to $C_s$ for VQ 306.

A centroid is computed for each of the $C_s$ cells for each of the uS matrix codebooks 310 and uS vector codebooks 312, respectively, for minimum quantization distortion using, for example, a Fuzzy C-algorithm or a fuzzy Linde-Buzo-Gray (LBG) algorithm as illustratively discussed in chapter 3 of the L. Cong thesis and further illustratively discussed in C. S. Xydeas and Lin Cong, "Robust Speech Recognition Using Fuzzy Matrix Quantisation, Neural Networks and Hidden Markov Models", pp. 1587–1590, EUSIPCO-96, Vol. Sep. 1, 1996, which is also incorporated by reference in its entirety. Note that $C_s$ for MQ 308 may be different or identical to $C_s$ for VQ 306.

To reduce demands on processing resources, each of the uS matrix codebooks 310 may be used to design a single matrix codebook 320 by combining the respective C, codewords, s=1, 2, ..., S, of each respective vocabulary word of the uS matrix codebooks 310 into u times C (Cu) centroids of the single matrix codebook 320, where in one embodiment C=($C_1+C_2+ ... +C_s$), where $C_s$ is the number of codewords in the $s^{th}$ matrix codebook and in a second embodiment, C=$C_1$=$C_2$= ... =$C_s$. For example, each codeword in the s=1 and n=1 codebook is concentrated with the corresponding codeword from the s=2 and n=1 codebook, and so on. The individual codewords are preferably unaltered after combining. 'Cu' may be chosen to accommodate available speech recognition system 300 resources and is, for example, equal to the training vocabulary word size times 32. Additionally, each of the uS vector codebooks 312 is used to design a single vector codebook 322 by combining the respective $C_s$, s=1, 2, ..., S, codewords of each of the uS vector codebooks 312 into u times C of the single vector codebook 322, where in one embodiment C=($C_1+C_2+ ... +C_s$), where $C_s$ is the number of codewords in the $s^{th}$ vector codebook and in a second embodiment, C=$C_1$=$C_2$= ... =$C_s$, and $C_3$ may vary between all vector and matrix codebooks to reduce quantization. The individual centroids are preferably unaltered after combining. For example, each codeword in the s=1 and n=1 codebook is concentrated with the corresponding codeword from the s=2 and n=1 codebook, and so on. Cu may be chosen to accommodate available speech recognition system 300 resources and is, for example, also equal to the raining vocabulary word size times 32. Additionally, "S" may be different or identical for uS matrix codebooks 310 and uS vector codebooks 312.

Matrix and vector codebook design is a general case, and, by setting s equal to one, the special case of nonsplit matrix and vector codebook design is accomplished. Recognition system 300 may use s codebooks, s=1, 2, ..., or S. Additionally, a single codebook for all u words with C codewords may be designed in a well-known manner.

MQ 308 utilizes interframe information related to the "evolution" of the speech short-term spectral envelopes input signal energy parameters of speech input signal 304 by operating on N consecutive, overlapping speech frames of acoustic signal 304 (FIG. 4). VQ 306 is a special case of MQ 308 where N is set to one, and, thus, VQ 306 operates within the frequency domain and not the time domain. Each frame of speech input signal 304 is represented by D LSP coefficients, and, thus, an N frames speech input signal 304 segment provides a P×N matrix of LSP coefficients which may be split into S submatrices for MQ 308, and each frame of speech input signal 304 provides a P dimension vector which is split into S subvectors for VQ 306, where S is less than or equal to P. Each frame of speech input signal 304 is also represented by the three energy parameters, log $E_{y,norm}$, ..., log $E'_{y,norm}$, and log $E''_{y,norm}$, and, thus, the N frame's input signal segment provides an additional 3×N matrix of energy parameters for MQ 308 and provides three additional dimensions to form a D+3 dimensions vector for VQ 306. Each matrix entry for MQ 308 and vector entry for VQ 306 for speech input signal 304 word $W_{nhm}$ may be designed using a training set of TO input signal spectral and energy parameter vectors respectively derived from each of the TO frames of each acoustic signal 304 word $W_{nhm}$. Thus, a set X={$x_1, x_2, ..., X_T$} of T (D+3)×N matrices for MQ 308 and T D+3 dimension vectors for VQ 306 for each acoustic signal 304 word $W_{nhm}$ results, where T=int(TO/N) and $x_k$ has the general form of:

$$x_k = \begin{bmatrix} x^k_{11} & x^k_{12} & \cdots & x^k_{1N} \\ x^k_{21} & x^k_{22} & \cdots & x^k_{2N} \\ \cdots & \cdots & \cdots & \cdots \\ x^k_{P1} & x^k_{P2} & \cdots & x^k_{PN} \end{bmatrix} = \begin{bmatrix} \hat{x}_{1k}(m_1) \\ \hat{x}_{2k}(m_2) \\ \cdots \\ \hat{x}S_k(mS) \end{bmatrix}$$

where $\hat{X}sk(ms)$, k=1, 2, ..., T, is formed by $m_s$ adjacent rows, s=1, 2, ..., S and is the $s^{th}$ submatrix for MQ308 and $s^{th}$ subvector with N equal to one for VQ 306. The first D entries of the $i^{th}$ column vector are the first through $D^{th}$ LSP spectral coefficients, respectively, and the last three parameters (D+1 through D+3) are log $E_{y,norm}$, log $E'_{y,norm}$, and log $E''_{y,norm}$, respectively. Notice that $$\sum_{s=1}^{S} m_s = P \text{ and } m_0 = 0.$$

Thus $$\hat{x}_{sk}(m_s) = \begin{bmatrix} x^k_{g+1,1} & x^k_{g+1,2} & \cdots & x^k_{g+1,N} \\ x^k_{g+2,1} & x^k_{g+2,2} & \cdots & x^k_{g+2,N} \\ \cdots & \cdots & \cdots & \cdots \\ x^k_{g+m_s,1} & x^k_{g+m_s,2} & \cdots & x^k_{g+m_s,N} \end{bmatrix} = [\overline{x}^k_{s1}, \overline{x}^k_{s2}, ..., \overline{x}^k_{sN}]$$

where $g = \sum_{s=0}^{s-1} m_s$.

In one embodiment of speech recognition system 300, the total number of rows in $X_k$ is P, and P equals D+3, where "3"

is the number of energy parameters used in the characterization of each frame of speech input signal 304 and "D" represents, for example, twelve consecutive orders of LSP frequency coefficients. S is, for example, selected to be two (2) to 'split' out the first six orders of LSP frequency coefficients where acoustic noise corruption is most prevalent from the fifteen total speech input signal 304 parameters. Thus, for $\hat{x}1k(M1)$, $m_1$ equals six and g=0. For $\hat{x}2k(m2)$, $m_2$ equals nine and g=6.

Each of the $\hat{x}sk(ms)$ entries includes j columns, j=1, 2, . . . , N. MQ 308 operates on time domain aspects of N frames of speech input signal 304, where N is greater than one and is, for example, two. VQ 306 is a special case of MQ 308 where j=N=1, and, thus, for VQ 306, $\hat{x}sk(ms)$ are vector entries. Thus, each of the uS matrix codebooks has rq times T $\hat{x}sk(ms)$ matrix entries, where the matrix entries for the $n^{th}$ vocabulary word are stored in the $n^{th}$ codebook, n=1, 2, . . . , u. Thus, in the embodiment where S=2, the u1 matrix codebooks contain the $\hat{x}1k(m1)$ matrix entries, and the u2 matrix codebooks contain the $\hat{x}2k(m2)$ matrix entries. The u1 vector codebooks contain the $\hat{x}1k(m1)$ vector entries, and the u2 vector codebooks contain the $\hat{x}2k(m2)$ vector entries.

Each set of T $\hat{x}sk(ms)$, s=1, 2, . . . , S. submatrices ("$X_{Ms}$") for MQ 308 and subvectors ("$X_{Vs}$") for the VQ 306, is processed, using, for example, the LBG algorithm, to yield respective $C_s$-cell $A_i^s$, i=1, 2, . . . , $C_s$ partitions of the s-submatrix space and, thus, produces a $C_s$ entries codebook containing $v_i^1$, i=1, 2, . . . , $C_s$, $m_s \times N$ centroids:

$$v_i^s = \begin{bmatrix} v_{g+1,1}^i & v_{g+1,2}^i & \cdots & v_{g+1,N}^i \\ v_{g+2,1}^i & v_{g+2,2}^i & \cdots & v_{g+2,N}^i \\ \cdots & \cdots & \cdots & \cdots \\ v_{g+m_s,1}^i & v_{g+m_s,2}^i & \cdots & v_{g+m_s,N}^i \end{bmatrix} = [\overline{v}_{s1}^i, \overline{v}_{s2}^i, \ldots, \overline{v}_{sN}^i]$$

where N is greater than one for uS matrix codebooks 310 and equals one for uS vector codebooks 312. The uS vector codebooks 312 and uS matrix codebooks 310 are processed using, for example, the LBOG algorithm to obtain the minimum overall distortion between the training data base speech input signal 304 words and centroids using, for example, the distortion equations and distance measures described herein in conjunction with quantization and also as described in chapter 3 of the L. Cong thesis. In one embodiment, S is two to correspond to the split of input data parameters in one embodiment set forth above, and, thus, for $v_i^1$, $m_1$ equals six and g equals 0, and for $v_i^2$, $m_2$ equals nine and g equals six.

Each of the $C_s$ codeword entries, $v_i^s$, for each of the uS single codebooks 310 may be combined as described above to form the single codebook 320 having Cu codeword centroid matrices, $v_{Mi}$, i=1, 2, . . . , Cu, with C centroid codewords per vocabulary word Also, each of the $C_s$ codeword entries, $v_i^s$, for each of the uS vector codebooks 312 may be combined as described above to form the single codebook 322 having Cu codeword centroid vectors, $v_{vi}$, i=1, 2, . . . , Cu, with C centroid codewords per vocabulary word.

During matrix and vector quantization, a distance measure is determined between predetermined codeword parameters and input signal parameters. The speech input signal 304 is quantized by associating the speech input signal 304 parameters to parameters of a single codeword in respective matrix and vector quantizers when making a 'hard' decision. When using a fuzzy decision process, the speech input signal 304 is quantized to parameters of multiple codewords in the VQ 306 and MQ 308, respectively, using a weighted degree of closeness. The type of parameters used to represent input signals and the codewords in respective single vector codebook 322 and single matrix codebook 320 and the distance measure algorithm employed generally play an important role in recognition (classification) accuracy, especially in acoustically noisy environments.

In different environments, speech is corrupted by acoustic noise of varying frequency. However, in some environments, the frequency bands occupied by noise signals can be generally predictable. For example, in an automotive environment, a large portion of acoustic noise energy is concentrated in the low frequency 300–400 Hz range which can particularly corrupt male voices. Additionally, car noise energy is generally predictable at different operating speeds. Thus, the peak of the noise spectra in an automotive environment is substantially located in generally predictable low frequencies. The noise spectrum then decreases exponentially as frequencies increase until after about 4 kHz the acoustic noise energy is very low. Through analyzing the effect of the automotive noise on LSP speech parameters, we found that the power of the car noise affects low order LSP parameters more than the high order LSP parameters.

A distance measure between the speech input signal 304 spectral frequencies and codeword spectral frequencies may be manipulated to further compensate for noise corruption. More specifically, noise compensation error factors may be computed using an error power spectrum of an input signal and a predicted input signal. The noise to be compensated for may be known, for example, from knowledge of a specific operating environment or may be dynamically determined. The error factors may be used to appropriately shift and weight each of the $i^{th}$ input signal and codeword spectral frequencies to compensate for noise corruption. Thus, when the energy parameters are combined with other signal parameters, such as line spectral pair coefficients, recognition accuracy may be enhanced. Exemplary distance measures and algorithms are described below and others are illustratively described in chapter 3 of the L. Cong thesis and in Asghar and Cong, "Robust Distance Measure". Furthermore, speech recognition system 300 may use any other distance measures and algorithms which are appropriate for the parameters used to characterize speech input signal 304.

Continuing the training process of speech recognition system 300, each of the training database entries in the urq training word database are again provided as a respective training speech input signal 304 to speech recognition system 300. Each speech input signal 304 word $W_{nhm}$ is preprocessed by preprocess operation 312, and LPC coefficients and energy parameters log $E_{y,norm}$, log $E'_{y,norm}$, and log $E'_{y,norm}$ are derived in LPC and energy parameters operation 316 from each frame of speech input signal 304 as described above. Each of the LPC coefficients is converted into D respective LSP frequencies by LSP operation 318. When using respective single vector and matrix codebooks, each of the speech input signal 304 training words $W_{nhm}$ is again represented by a respective set of the TO speech spectral vectors for each frame of each speech input signal 304 word $W_{nhm}$, which result in the set $X=\{x_1, x_2, \ldots, x_T\}$ of T, where $x_k = \overline{x}_k(1), \overline{x}_k(2), \ldots, \overline{x}_k(N)$
with $\overline{x}_k(j) = [x_{1j}^k, x_{2j}^k, \ldots, x_{pj}^k]^T$
and the number of columns j in each of $x_k$ equals N, and N is greater than one for MQ 308 and equals one for VQ 306.

The respective fuzzy vector and matrix quantization of each of the training words $W_{nhm}$, using the single vector codebook 322 and single matrix codebook 320, respectively, are described by respective Cu x T fizzy classification matrices $U_{sF}$ with respective elements $u^F_{ik} \in [0,1]$, $i=1, 2, \ldots, Cu$, $k=1,2, \ldots, T$. The value of $U^F_{ik}$, $0 \leq u^F_{ik} \leq 1$, indicates the degree of fuzziness of the $k^{th}$ input matrix $x_k$ to the $i^{th}$ partitioning cell which is represented by the centroid vectors $v_{vi}$ and centroid matrices $v_{Mi}$, for VQ 306 and MQ 308, respectively.

The fuzzy classification matrix $U_F$ is defined generally as:

$$U_F = \begin{array}{c} \begin{array}{cccc} O_1 & O_2 & \cdots & O_T \end{array} \\ \begin{bmatrix} u^F_{11} & u^F_{12} & \cdots & u^F_{1T} \\ u^F_{21} & u^F_{22} & \cdots & u^F_{2T} \\ \cdots & \cdots & \cdots & \cdots \\ u^F_{Cu1} & u^F_{Cu2} & \cdots & u^F_{CuT} \end{bmatrix} \end{array}$$

Two conditions are also satisfied for both MQ 308 and VQ 306:

$$\sum_{i=1}^{Cu} u^F_{ik} = 1 \text{ and } \sum_{k=1}^{T} u^F_{ik} > 0$$

In this case, $U^F_{ik}$ is derived as:

$$u^F_{ik} = \frac{1}{\sum_{j=1}^{Cu} \left(\frac{d_{ik}(x_k, v_i)}{d_{jk}(x_k, v_j)}\right)^{\frac{1}{(F-1)}}}$$

where the constant F influences the degree of fuzziness for $F>1$.

The respective columns $O_k$ of the classification matrices $U_{VF}$ and $U_{MF}$ "map" 15 speech input signal 304 entries $x_k$ to $V_{Vi}$ for VQ 306 and $V_{Mi}$ for MQ 308, respectively, $i=1, 2, \ldots, Cu$. For both VQ 306 and MQ 308, the distance between columns $O_k = \{u_{1k}, u_{2k}, \ldots, u_{Cu\ k}\}$ and the respective VQ 306 and MQ 308 centroid matrices are defined generally as:

$$J(O_k, V) = \sum_{i=1}^{Cu} u^F_{ik} d(x_k, v_i),$$

where $v_i$ represents $v_{vi}$ and $v_{mi}$ for VQ 306 and MQ 308, respectively. Furthermore, the overall distortion of the Cu centroid entries of VQ 306 and MQ 308 when operating on each TxN sub-matrix set where N equals one for VQ 306, is:

$$J(U, V) = \sum_{k=1}^{T} \sum_{i=1}^{Cu} u^F_{ik} d(x_k, v_i).$$

Note that the summation of the components of the respective $O_k$ columns is equal to unity. The largest $u^F_{ik}$ component is the one which corresponds to the cell (centroid) with the smallest $d(x_k, v_i)$ distance measure. The $O_k$ columns can be interpreted as a probability mass matrix relating the T speech input signal 304 representative matrices $x_k$ for MQ 308 and T speech input signal 304 representative vectors for VQ 306 to all $v_i$, $i=1, 2, \ldots, Cu$, matrix and vector codewords, respectively. The total respective observation sequence $O_w$ of probability mass vectors for each speech input signal 304 word W for the single matrix codebook 320, and for single vector codebook 322, is defined as $O_w = \{\{O_1, O_2, \ldots, O_T\}, O_k\{u^F_{1k}, u^F_{2k}, \ldots, u^F_{cU\ k}\}\}$, where $n=1, 2, \ldots, u$ and $k=1, 2, \ldots, T$.

where N=1 for VQ 306 and N is equal to the number of columns of $x_k$ for MQ 308. Distance measurements may be determined as described above The general distortion equation is:

$$J(W, V) = \sum_{k=1}^{T} \sum_{i=1}^{Cu} w_{ik} d(x_k, v_i), \quad k = 1, 2, \ldots, T \text{ with}$$

$$w_{ik} = \begin{cases} u_{ik} & u_{ik} \in \{0, 1\}, \text{ (hard decision process)} \\ u^F_{ik} & u_{ik} \in [0, 1], \text{ (fuzzy decision process)}. \end{cases}$$

Furthermore, the overall distortion for all of the codeword entries in the VQ 306 and MQ 308 while operating on the complete X matrix set is $$J(U, V) = \sum_{k=1}^{T} \sum_{i=1}^{Cu} u^F_{ik} d(x_k, v_i).$$

Split vector and split matrix design and quantization are illustratively described in chapter 3 of the L. Cong thesis. Hard decision vector and matrix quantization be used to quantize speech input signal 304 and is illustratively discussed in chapter 3 of the L. Cong thesis.

During the training mode of speech recognition system 300, the training input data for the hidden Markov models of classifier HMM$\lambda_{Vn}$, $n=1, 2, \ldots, u$, are in one embodiment the observation sequences $O_{Vn}$ of probability mass vectors $O_{vk}$ from classification matrix $U_V$. The classification matrix $U_V$ is generated by VQ 306 from a fuzzy or hard, and split or nonsplit vector quantized speech input signal 304 for each of the training words $W_{nhm}$ as described above. Each of the respective u vocabulary words for each repetition r and SNR levels q is, in one embodiment, fuzzy vector quantized to train a corresponding HMM$\lambda_{Vn}$ process. Each of the observation sequences $O_{Vn}$ from VQ 306 for each of the urq training words train corresponding HMM$\lambda_{Vn}$ processes, i.e. for an $n^{th}$ vocabulary word, an input observation sequence $O_{Vn}$ trains only the $n^{th}$HMM$\lambda_{Vn}$. Separate gender specific HMM$\lambda_{Vn}$'s may be built for males and females by using the rq versions of each word by male speakers for male HMM$\lambda_{Vn}$ and female speakers for female HMMs, and the number of states of each HMM$\lambda_{Vn}$ is set to, for example, five. The state transition probability and probability distribution parameters, which correspond to specific observations, are optimized in a well-known manner for each HMM$\lambda_{Vn}$. HMM$\lambda_{Vn}$ training is further described in chapters 2 and 4 of the L. Cong thesis.

Likewise, during the training mode of speech recognition system 300, the training input data for the hidden Markov models of classifier HMM$\lambda_{Mn}$, $n=1, 2, \ldots, u$, are in one embodiment the observation sequences $O_{Mn}$ of probability mass vectors $O_{Mk}$ from classification matrix $U_M$. The classification matrix $U_M$ is generated by MQ 308 from a fuzzy or hard, and split or nonsplit matrix quantized speech input signal 304 for each of the training words $W_{nhm}$ as described above. Each of the respective u vocabulary words for each repetition r and SNR levels q is, in one embodiment, fuzzy matrix quantized to train a corresponding HMM$\lambda_{Mn}$ process. Each of the observation sequences $O_{Mn}$ from MQ 308 for each of the urq training words train corresponding HMM$\lambda_{Mn}$ processes, i.e. for an $n^{th}$ vocabulary word, an input observation sequence $O_{Mn}$ trains only the $n^{th}$HMM$\lambda_{Mn}$. Separate gender specific HMM$\lambda_{Mn}$'s may be built for males and females by using the rq versions of each word by male speakers for male HMMs and female speakers for female HMMs, and the number of states of each HMM$\lambda_{Mn}$ is set to, for example, five. The state transition probability and probability distribution parameters, which correspond to specific observations, are optimized in a well-known manner for each HMM$\lambda_{Mn}$. HMM$\lambda_{Mn}$ training is further described in chapters 2 and 4 of the L. Cong thesis.

With path 2 selected, the NN 330 is trained by repeating the rq versions of the u signal 304 training words into speech recognition system 300, respectively quantizing the speech input signal 304 training words with VQ 306 and MQ 308, and determining the probabilities $Pr(O_{VW}|\lambda_{Vn})$ and $Pr(O_{MW}|\lambda_{Mn})$, n=1, 2, ..., u, using Viterbi algorithms 324 and 326, respectively, for each of the u HMM$\lambda_{Vn}$ and u HMM $\lambda_{Mn}$, where $O_{VW}$ and $O_{MW}$ are the respective VQ 306 and MQ 308 output observation sequences for one entire speech input signal 304 training word.

When speech recognition system 300 operates in a training mode, the $n^{th}$ probability $Pr(O_{VW}|\lambda_{Vn})$ from HMM$\lambda_{Vn}$ is combined by the mixer with the $n^{th}$ probability $Pr(O_{MW}|\lambda_{Mn})$ from HMM$\lambda_{Mn}$ for n=1, 2, ..., u to generate MQ error compensated classification data, D(n), for each of the u vocabulary words of speech recognition system 300, where D(n) is defined in one embodiment as:

D(n)=αPr(OMW|λMn)+Pr(OVW|λVn), n=1, 2, ..., u.

The scaling constant 'α' may be adjusted to maximize recognition accuracy and is, for example, set to two. Note that the Viterbi algorithm generally internally computes the logarithm of outcome probabilities in a well-known manner using:

$$B_i(t) = \prod_{s=1}^{S} \sum_{j=1}^{Cu} u_s(j, t) b_{si}(j)$$

where i=1, 2, ..., Q, and Q=the number of HMM states, t=1, 2, ..., TO, and j=1, 2, ..., Cu, and s represents data from corresponding HMMs to be combined; for example, s=1 represents data from HMMs associated with mean compensated parameters and s=2 represents data from HMMs associated with non-mean compensated parameters.

Mixer 328 selectively provides output data to NN 330. In one embodiment, mixer 328 provides all 2u probabilities $Pr(O_{VW}|\lambda_{Vn})$ and $Pr(O_{MW}|\lambda_{Mn})$ and u compensated classification output data D(n) for n=1, 2, ..., u as input data to NN 330. NN 330 is trained to accurately identify the $n^{th}$ speech input signal 304 training word as the $n^{th}$ vocabulary word. Note that other direct distance measure data from VQ 306 and MQ 308 may also be used in selective combination with previous input data as illustratively described in U.S. patent application Ser. No. 08/883,978 by Lin Cong and Safdar M. Asghar and entitled "Adaptive Speech Recognition With Selective Input Data To A Speech Classifier", which is incorporated by reference in its entirety.

In one embodiment neural network 330 is a multilayer perceptron type NN. Multilayer networks overcome many of the limitations of single-layer networks. That is, multilayered, hierarchical networks are more powerful because of the nonlinearities and the internal representation generated in the so-called hidden layers. The multiple nodes in the output layer typically correspond to multiple classes in the multi-class pattern recognition problem. In general, an MLP neural network 330 has an ability to partition an input pattern space in a classification problem and to represent relationships between events. Additionally, MLP neural network 330 with multiple layers and sufficient interconnections between nodes ensures an ability to "learn" complex classification boundaries, and implement nonlinear transformations for functional approximation problems. The MLP neural network 330 has G hidden nodes where G is preferably determined empirically based upon the number of u vocabulary words, memory size, and processing capabilities.

After training the speech recognition system 300, path 2 is selected to engage the recognition process. When any speech input signal 304 word $W_n$ is spoken by a user, VAD 314 effectively defines end points of input words for IWSR. Speech input signal 304 word $W_n$ is next preprocessed by preprocess operation 312 as described above. Word $W_n$ is sampled at, for example, 8 ksamples/sec, and segmented into TO frames of t seconds each, such as t equal to 20 msec with a 10 msec overlap of each consecutive frame of $W_n$. LPC and energy parameters operation 316 generates D LPC coefficients and the log $E_{y,norm}$, log $E'_{y,norm}$, and log $E''_{y,norm}$ energy coefficients for each frame of the $W_n$, and LSP operation 318 generates $D^{th}$ order LSP coefficients from the LPC coefficients as described above.

Each frame of speech input signal 304 is again represented by D order LSP coefficients and the three energy parameters, log $E_{y,norm}$, log $E'_{y,norm}$, and log $E''_{y,norm}$.

VQ 306 vector quantizes the vector representation $X_{Vn}$ of word W with the designed codeword entries of the single vector codebook 322. Single vector codebook 322 yields the observation sequence $O_{VW}$ as described above for the particular speech input signal 304 word $W_n$. Observation sequence $O_{VW}$ is used as input data by a Viterbi algorithm 324 operating on each of the HMM$\lambda_{Vn}$ processes, n=1, 2, ..., u. Viterbi algorithm operation 324, described in chapter 4 of L. Cong, "A Study of Robust IWSR Systems" utilizes a respective observation sequence OVW to produce respective maximum likelihood probabilities $Pr(O_{Vn}|\lambda_{VW})$, n=1, 2, ..., u for each HMM$\lambda_{Vn}$ process. The u probability data outputs of the Viterbi algorithm 324 are the respective maximum likelihood probability measures $Pr(O_{VW}|\lambda_{Vn})$ that the respective HMM$\lambda_{Vn}$ process produced the observation sequence $O_{VW}$. Note that $0 \leq Pr(O|\lambda) \leq 1$, and the Viterbi algorithm generally produces a logarithmic probability.

Likewise, MQ 308 matrix quantizes the matrix representation $X_{Mn}$ of word W with the designed codeword entries of the single matrix codebook 320. Single matrix codebook 320 yields the observation sequence $O_{MW}$ as described above for the particular speech input signal 304 word $W_n$. Observation sequence $O_{MW}$ is used as input data by Viterbi algorithm 326 operating on each of the HMM$\lambda_{Mn}$ processes, n=1, 2, ..., u. Viterbi algorithm operation 326, described in chapter 4 of L. Cong, "A Study of Robust IWSR Systems" utilizes a respective observation sequence OMw to produce respective maximum likelihood probabilities $Pr(O_{MW}|\lambda_{Mn})$ n=1, 2, ..., u for each HMM$\lambda_{Mn}$ process. The u probability data outputs of the Viterbi algorithm 326 are the respective maximum likelihood probability measures $Pr(O_{MW}|\lambda_{Mn})$ that the respective HMM$\lambda_{Mn}$ process produced the observation sequence $O_{MW}$.

When speech recognition system 300 operates in a recognition mode, the $n^{th}$ probability $Pr(O_{VW}|\lambda_{Vn})$ from HMM$\lambda_{Vn}$ is combined by the mixer with the $n^{th}$ probability $Pr(O_{MW}|\lambda_{Mn})$ from HMM$\lambda_{Mn}$ for n=1, 2, ..., u to generate MQ error compensated classification data, D(n), for each of the u vocabulary words of speech recognition system 300, where D(n) is again defined in one embodiment as:

D(n)=αPr(OMW|λMn)+Pr(OVW|λVn), n=1, 2, ... u.

The scaling constant 'α' may be adjusted to maximize recognition accuracy and is, for example, set to two. Computing resources may be more favorably disposed to computing the logarithm of each D(n) for n=1, 2, . . . , u and obtaining respective absolute values. It will be recognized that either or both $\Pr(O_{VW}|\lambda_{Mn})$ and $\Pr(O_{MW}|\lambda_{Mn})$ may be scaled.

Mixer 328 selectively provides output data to NN 330. In one embodiment, mixer 328 provides D(n) output data and the separate u respective Viterbi algorithm probability output data from VQ 306 and MQ 308 as 3u respective input data to NN 330. Mixer 328 selectivity may be based on the computing resources available with respect to accuracy degradation factors present, such as detected noise levels. The NN 330 provides u output data $OUT_n$, n=1, 2, . . . , u. The NN 330 output data have respective values between 0 and 1 which represent the likelihood that the speech input signal 304 word corresponds to the $n^{th}$ word with 1 being a higher probability. Decision logic 332 then classifies the speech input signal 304 word $W_n$ as the $n^{th}$ vocabulary word if OUT(n)=max{OUT(1), OUT(2), . . . , OUT(u)}.

Thus, a speech recognition system may be trained using a variety of training input signals that may vary not only in vocabulary, but also in other areas such as signal to noise ratio and gender. Each such input signal may then be characterized by, for example, LSP spectral parameters. Each characteristic parameter may then be used to develop vector quantizer and matrix quantizer input data. Centroids are subsequently developed and organized in multiple codebooks, for example, one per vocabulary word per quantizer, and may be further organized into single codebooks, one for each quantizer, by combining the respective multiple codebooks groups for each respective quantizer.

Each training input signal may then be quantized independently by the vector and matrix quantizers using, for example, either hard or fuzzy logic. Various distance measures may be employed to reduce quantization errors and thus enhance recognition accuracy. Split quantization may be used to focus different processing, such as varying distance measure algorithms, on different characteristic parameters.

Stochastic models, such as HMMs, may be employed as post classifiers. Each HMM may model a different vocabulary word and may also be gender specific. The quantized characteristic parameters for an input signal word from each quantizer serve as the observation sequence to be modeled by the respective HMM.

Training input signal data is again used to train a neural network. Output probabilities are generated by each HMM from the quantization data observation sequences. The probabilities computed by, for example, the Viterbi algorithm for each HMM from both vector and matrix quantizers are combined in accordance with a predetermined algorithm and used as input data to train the neural network. The Viterbi algorithm probabilities from each HMM may also be provided to the neural network.

The recognition process follows the neural network training process except that the output data of the trained neural network is examined to select the most likely vocabulary word resulting from the input signal word. Thus, the input signal word is recognized with a high probability of accuracy.

While the invention has been described with respect to the embodiments and variations set forth above, these embodiments and variations are illustrative and the invention is not to be considered limited in scope to these embodiments and variations. For example, it will be recognized that continuous time data and continuous time algorithms may be used in substitution of the discrete time data and discrete time algorithms, respectively. Additionally, other input signal parameter types may be used to characterize speech input signal 304, and other distance measures may be used. Using continuous time methods will generally increase processing requirements. Also, split HMMs may use respective split matrix observation sequences from VQ 306 and respective split matrix observation sequences from MQ 308 during training and speech recognition. Furthermore, output distance measure data from VQ 306 and MQ 308 may be selectively combined with output data from mixer 330 to form input data for NN 330 as illustratively described in U.S. patent application Ser. No. 08/883,978 by Lin Cong and Safdar M. Asghar and entitled "Adaptive Speech Recognition With Selective Input Data To A Speech Classifier", which is incorporated by reference in its entirety to provide speech recognition. Also, the overall respective distance measures from VQ 306 and MQ 308 may be combined, with or without weighting, to provide speech recognition. Additionally, speech input signal 304 may be more generally any speech or nonspeech acoustic input signal with preprocessing being modified to accommodate, for example, any known bandwidth information. Moreover, speech input signal 304 may be a general input signal with likewise processing modifications. Accordingly, various other embodiments and modifications and improvements not described herein may be within the spirit and scope of the present invention, as defined by the following claims.

What is claimed is:

1. A speech recognition system comprising:
   a vector quantizer to receive first parameters of an input signal and to generate a first quantization observation sequence;
   a first speech classifier to receive the first quantization observation sequence from the vector quantizer and to generate first respective speech classification output data;
   a matrix quantizer to receive second parameters of the input signal, and to generate a second quantization observation sequence;
   a second speech classifier to receive the second quantization observation sequence from the matrix quantizer and to generate second respective speech classification output data;
   a mixer to combine corresponding first and second respective speech classification data to generate third respective speech classification data and to generate output data from the first, second, and third speech classification data; and
   a neural network to receive output data from the mixer and to determine fourth respective speech classification output data.

2. The speech recognition system as in claim 1 wherein the first and second speech classifiers are a first and second set, respectively, of hidden Markov models.

3. The speech recognition system as in claim 1, wherein the vector quantizer is a split vector quantizer and the first parameters are partitioned into $S_1$ partitions, wherein $S_1$ is greater than 1.

4. The speech recognition system as in claim 1 wherein the matrix quantizer is a split matrix quantizer and the second parameters are partitioned into $S_2$ partitions, wherein $S_2$ is greater than 1.

5. The speech recognition system as in claim 1 wherein the vector and matrix quantizers utilize respective single codebooks.

6. The speech recognition system as in claim 1 wherein the input signal for reception by the vector quantizer and matrix quantizer is a spoken word.

7. The speech recognition system as in claim 1 wherein the vector and matrix quantizers are split vector and split matrix quantizers, respectively, and the first parameters are partitioned into $S_1$ partitions and the second parameters are partitioned into $S_2$ partitions.

8. The speech recognition system as in claim 7 wherein the split vector quantizer is capable of partitioning the first parameters to separate first parameters primarily affected by localized noise from the remaining first parameters, and the split matrix quantizer is capable of partitioning the second parameters to separate second parameters primarily affected by localized noise from the remaining second parameters.

9. The speech recognition system as in claim 8 wherein the first and second parameters include line spectral pair coefficients, $S_1$ and $S_2$ equal two, the first parameters in a first submatrix of the split vector quantizer include the first $N_1$ of P order line spectral pair coefficients, and the second parameters in a first submatrix of the split matrix quantizer include the first $N_1$ of P order line spectral pair coefficients.

10. The speech recognition system as in claim 9 wherein the split vector and split matrix quantizers respectively are capable of determining a distance measure between an $i^{th}$ line spectral pair frequency of the input signal and respective $i^{th}$ order line spectral pair frequencies of a plurality of codewords, wherein the distance measure, for i=1 to $N_1$, is proportional to (i) a difference between the $i^{th}$ input signal line spectral pair frequencies and the $i^{th}$ border line spectral pair frequencies of the codewords and (ii) a shift of the difference by an $i^{th}$ frequency shifting factor, wherein $N_1$ is greater than or equal to one and less than or equal to P, and P is the highest order line spectral pair frequency of the input signal and codewords.

11. The speech recognition system as in claim 10 wherein noise frequencies are primarily located in the frequency range substantially coinciding with the frequency range represented by line spectral pairs i=1 to $N_1$.

12. The speech recognition system as in claim 9 wherein the split vector and split matrix quantizers include respective enhanced distance measures which are capable of operating on the first submatrix of the split vector quantizer and the first submatrix of the split matrix quantizer, respectively.

13. The speech recognition system as in claim 1 wherein the first parameters of the input signal for reception by the vector quantizer include P order line spectral pairs of the input signal, and the second parameters of the input signal for reception by the matrix quantizer include temporally related P order line spectral pairs, wherein P is an integer.

14. The speech recognition system as in claim 13 wherein P equals twelve.

15. The speech recognition system as in claim 1 wherein the first parameters of the input signal include the energy of the input signal and first and second derivatives of the input signal energy.

16. The speech recognition system as in claim 1 wherein the vector and matrix quantizers utilize fuzzy quantization.

17. A speech recognition system comprising:
a vector quantizer to receive first parameters of an input signal and to generate a first quantization observation sequence, wherein the first parameters are grouped into $S_1$ partition(s);
a split matrix quantizer to receive second parameters of the input signal and to generate a second quantization observation sequence, wherein the second parameters are grouped into $S_2$ partition(s);
a first speech classifier to receive the first quantization observation sequence from the vector quantizer and generate first respective speech classification output data;
a second speech classifier to receive the second quantization observation sequence from the split matrix quantizer and generate second respective speech classification output data;
a mixer to combine corresponding first and second respective speech classification data to generate third respective speech classification data and to provide output data based on the first, second, and third classification data; and
a neural network to receive the mixer output data and to generate fourth respective speech classification data based on the mixer output data.

18. The speech recognition system as in claim 17 wherein $S_1=S_2=1$.

19. The speech recognition system as in claim 17 wherein the first and second speech classifiers are a first and second set, respectively, of hidden Markov models.

20. An apparatus comprising:
a first speech classifier to operate on $S_1$ group(s) of first parameters of an input signal and to provide first output data relating the input signal to first reference data, wherein the first input signal parameters include frequency and time domain parameters, wherein $S_1$ is a positive integer;
a second speech classifier to operate on $S_2$ group(s) of second parameters of the input signal and to provide second output data relating the second input signal to second reference data, wherein the second parameters of
the input signal include the frequency domain parameters, wherein $S_2$ is a positive integer;
mixer to combine the first output data and the second output data into third
output data so that the second output data compensates for errors in the
first output data; and a neural network to receive selected output data from the mixer and to generate
output data to classify the input signal.

21. The apparatus as in claim 20 wherein $S_1=S_2=1$.

22. The apparatus as in claim 20 wherein the first speech classifier is capable of operating on each of the $S_1$ partitions of the first parameters of the input signal using respective distance measures to relate the respective partitioned first parameters to partitioned first reference data, and the second speech classifier is capable of operating on each of the $S_2$ partitions of the second parameters of the input signal using respective distance measures to relate the respective partitioned second parameters to partitioned second reference data.

23. The apparatus as in claim 22 wherein at least one of the $S_1$ partitions of first parameters of the input signal are corrupted by noise and the respective distance measure to relate the respective noise corrupted first parameters to partitioned first reference data has noise rejection features; and
wherein at least one of the $S_2$ partitions of the second parameters of the input signal are corrupted by noise and the respective distance measure to relate the respective noise corrupted second parameters to partitioned second reference data has noise rejection features.

24. The apparatus as in claim 20 wherein $S_1$ is greater than one and $S_2$ is greater than one.

25. The apparatus as in claim 20 wherein the first speech classifier includes a fuzzy split matrix quantizer, and the second speech classifier includes a fuzzy split vector quantizer.

26. The apparatus as in claim 25 wherein the first speech classifier further includes a first set of hidden Markov models, and the second speech classifier further includes a second set of hidden Markov models.

27. The apparatus as in claim 20 wherein the second speech classifier is capable of operating on frequency domain parameters of the input signal.

28. The apparatus as in claim 20 wherein the frequency domain parameters are P order line spectral pair frequencies, wherein P is an integer.

29. The apparatus as in claim 20 wherein the first and second parameters of the input signal further include input signal energy related parameters.

30. A method comprising the steps of:
 processing first parameters of the input signal to relate the first parameters to first reference data wherein the first parameters include frequency and time domain information;
 generating first output data relating the first parameters to reference data;
 processing second parameters of the input signal to relate the second parameters to second reference data wherein the second parameters include frequency domain information;
 generating second output data relating the second parameters to the second reference data;
 combining the first output data and second output data into third output data to compensate for errors in the first output data; and
 providing the first, second, and third output data to a neural network to classify the input signal.

31. The method as in claim 30 further comprising the steps of:
 partitioning the first parameters of the input signal into $S_1$ groups; and
 partitioning the second parameters of the input signal into $S_2$ groups.

32. The method as in claim 31 wherein the step of partitioning first parameters of an input signal into $S_1$ groups comprises the step of:
 partitioning the first parameters of the input signal to group at least one subset of the first parameters which are generally corrupted by localized noise.

33. The method as in claim 32 wherein the step of partitioning first parameters of an input signal into $S_1$ groups comprises the step of:
 partitioning the first parameters of the input signal to group at least one subset of the first parameters which are generally corrupted by localized noise.

34. The method as in claim 30 wherein the first parameters and first reference data include respective corresponding line spectral pair frequencies, the second parameters and second reference data include respective corresponding line spectral pair frequencies, and the subset of the first parameters which are generally corrupted by localized noise are the $m^{th}$ through $n^{th}$ line spectral frequencies, the step of processing the first parameters further comprising the step of:
 matrix quantizing the $m^{th}$ through $n^{th}$ line spectral frequencies of the first parameters using a distance measure proportional to (i) a difference between the $i^{th}$ input signal line spectral pair frequencies and the $i^{th}$ order first reference data line spectral pair frequencies and (ii) a weighting of the difference by an $i^{th}$ frequency weighting factor, wherein m is less than or equal to i, and n is greater than or equal to i; and
 the step of processing the second parameters further comprising the step of:
 vector quantizing the $m^{th}$ through $n^{th}$ line spectral frequencies of the second parameters using a distance measure proportional to (I) a difference between the $i^{th}$ input signal line spectral pair frequencies and the $i^{th}$ order second reference data line spectral pair frequencies and (ii) a weighting of the difference by an $i^{th}$ frequency weighting factor, wherein m is less than or equal to i.

35. The method as in claim 30 wherein the step of processing the first parameters of the input signal comprises the step of:
 matrix quantizing each of the partitioned first parameters of the input signal; and
 the step of processing second parameters of the input signal comprises the step of:
 vector quantizing each of the second parameters of the input signal.

36. The method as in claim 35 wherein the step of matrix quantizing further comprises the step of:
 fuzzy matrix quantizing each of the first parameters of the input signal; and
 wherein the step of vector quantizing further comprises the step of:
 fuzzy vector quantizing each of the second parameters of the input signal.

37. The method as in claim 36 wherein the step of fuzzy matrix quantizing further comprises the step of:
 fuzzy matrix quantizing each of the first parameters of the input signal using a first codebook; and
 wherein the step of fuzzy vector quantizing further comprises the step of:
 fuzzy vector quantizing each of the second parameters of the input signal using a second single codebook.

38. The method as in claim 35 wherein the step of processing the first parameters of the input signal further comprises the step of:
 determining first respective input signal recognition probabilities from a plurality of first hidden Markov models; and
 wherein the step of processing the second parameters of the input signal further comprises the step of:
 determining second respective input signal recognition probabilities from a plurality of second hidden Markov models.

39. The method as in claim 30 wherein the step of combining comprises the step of:
 weighting the second output data; and
 adding the weighted second output data to the first output data.

40. A method of recognizing speech comprising the steps of:
 receiving an input signal;
 determining parameters of the input signal;
 vector quantizing the parameters of the input signal to obtain first quantization output data;
 classifying the first quantization output data;
 matrix quantizing the parameters of the input signal to obtain second quantization output data;
 classifying the second quantization output data;
 combining the first and second quantization output data to generate third output data; and
 generating an identification of the input signal with a neural network based upon the classification of the first and second quantization output data and the third output data.

41. The method as in claim 40 wherein the step of generating the identification of the input signal further comprises the steps of:

weighting the classification of the first quantization output data; and adding the weighted classification of the first quantization output data and the classification of the second quantization output data.

42. The method as in claim 40 wherein the step of determining parameters of the input signal comprises the step of:

determining P order line spectral pairs for each of TO frames of the input signal.

43. The method as in claim 40 wherein the step of vector quantizing further comprises the step of:

fuzzy split vector quantizing the parameters of the input signal, wherein the first quantization output data is fuzzy data; and wherein the step of matrix quantizing further comprises the step of:

fuzzy split matrix quantizing the parameters of the input signal, wherein the second quantization output data is fuzzy data.

44. A method of recognizing speech comprising the steps of:

receiving an input signal;

determining D order line spectral pairs for TO frames of the input signal, wherein D and TO are integers;

determining parameters related to the energy of the input signal, wherein the parameters related to the energy of the input signal include the input signal energy and a first derivative of the input signal energy;

vector quantizing the D order line spectral pairs for each of the TO frames and the parameters related to the input signal energy;

classifying the input signal using the vector quantization of the D order line spectral pairs;

matrix quantizing the D order line spectral pairs and the parameters related to the input signal energy for T matrices of frames of the input signal, wherein T is defined as int(TO/N), and N is the number for input signal frames represented in each of the T matrices;

classifying the input signal using the matrix quantization of the D order line spectral pairs and parameters related to the input signal energy;

combining the classifications of the input signal and providing the individual classifications of the input signal and the combined classification of the input signal to a neural network.

* * * * *